INVENTOR
R.D.SUTCH
By M. [signature]
ATTORNEY

Jan. 2, 1968 R. D. SUTCH 3,361,662

ANODIZING APPARATUS

Filed Feb. 20, 1964 3 Sheets-Sheet 2

Jan. 2, 1968 R. D. SUTCH 3,361,662

ANODIZING APPARATUS

Filed Feb. 20, 1964 3 Sheets-Sheet 3

United States Patent Office 3,361,662

Patented Jan. 2, 1968

3,361,662

ANODIZING APPARATUS

Richard D. Sutch, Allentown, Pa., assignor to Western Electric Company, Incorporated, a corporation of New York Filed Feb. 20, 1964, Ser. No. 346,243

13 Claims. (Cl. 204—224)

ABSTRACT OF THE DISCLOSURE

Anodizing apparatus includes a plurality of capillaries arranged in a configuration which is essentially a mirror image of a portion of a metallic pattern of an article to be anodized. A reservoir supplies anodizing solution to the capillaries. The article is positioned with respect to the capillaries such that the portion to be anodized is in registration therewith and is wet by the anodizing solution. Cathode means are arranged with respect to the capillaries such that, with anodizing potential supplied across the metallic portion and the cathode means, each part of the portion to be anodized has substantially the same ionic conduction path thereto. The capillaries can be formed of a plurality of spaced, parallel plate-like elements.

This invention relates to anodizing apparatus, and more particularly to apparatus for selectively anodizing a portion of a metallic pattern, such as a thin film circuit deposited on a suitable substrate.

Generally, a thin film circuit, which may include a plurality of resistors and associated interconnecting paths and contacts, is fabricated by depositing a thin layer of an anodizable metal, such as tantalum, onto a flat glass or ceramic substrate. A desired circuit pattern of resistors is then generated by means of a photo-etching technique. Following generation of the pattern, low ohmic interconnecting paths and contacts are deposited on the substrate. The values of the resistors are a function of the thickness and geometric configuration of the tantalum film, which factors are selected such that the value of each resistor approximates, but is less than its desired value. The resistors are brought up to value by a process of electrochemical anodization.

During the anodization process it is necessary to mask or isolate the low ohmic interconnecting paths and contacts from the anodizing solution to preclude short circuiting of the resistors. Opposing the requirement for masking the interconnecting paths and contacts is the necessity to make electrical contact to certain of these elements in order to anodize and to enable monitoring of the progress of the anodization. Heretofore, these requirements have led to complex and cumbersome equipments involving complicated and lengthy operating procedures.

It is therefore an object of this invention to provide new and improved anodizing apparatus.

It is another object of this invention to provide new and improved apparatus for selectively anodizing a portion of a metallic pattern.

It is still another object of this invention to provide new and improved apparatus for selectively anodizing the electrical component portion of a thin film circuit.

Apparatus for selectively anodizing a portion of a metallic pattern on an article illustrating certain features of the invention may include a plurality of capillaries arranged in a configuration which is essentially a mirror image of the portion of the metallic pattern to be anodized. A reservoir is provided for receiving anodizing solution and for supplying the same to the capillaries. The article is positioned with respect to the capillaries in a manner such that the portion to be anodized is in registration therewith and is wet by the anodizing solution. Cathode means are arranged with respect to the capillaries such that each part of the portion to be anodized has substantially the same ionic conduction path to the cathode means. To accomplish the anodization, means are provided for supplying anodizing potential to the portion and to the cathode means.

A complete understanding of the invention may be had from the following detailed description of specific embodiments thereof, when read in conjunction with the appended drawings, in which.

Figure 1:
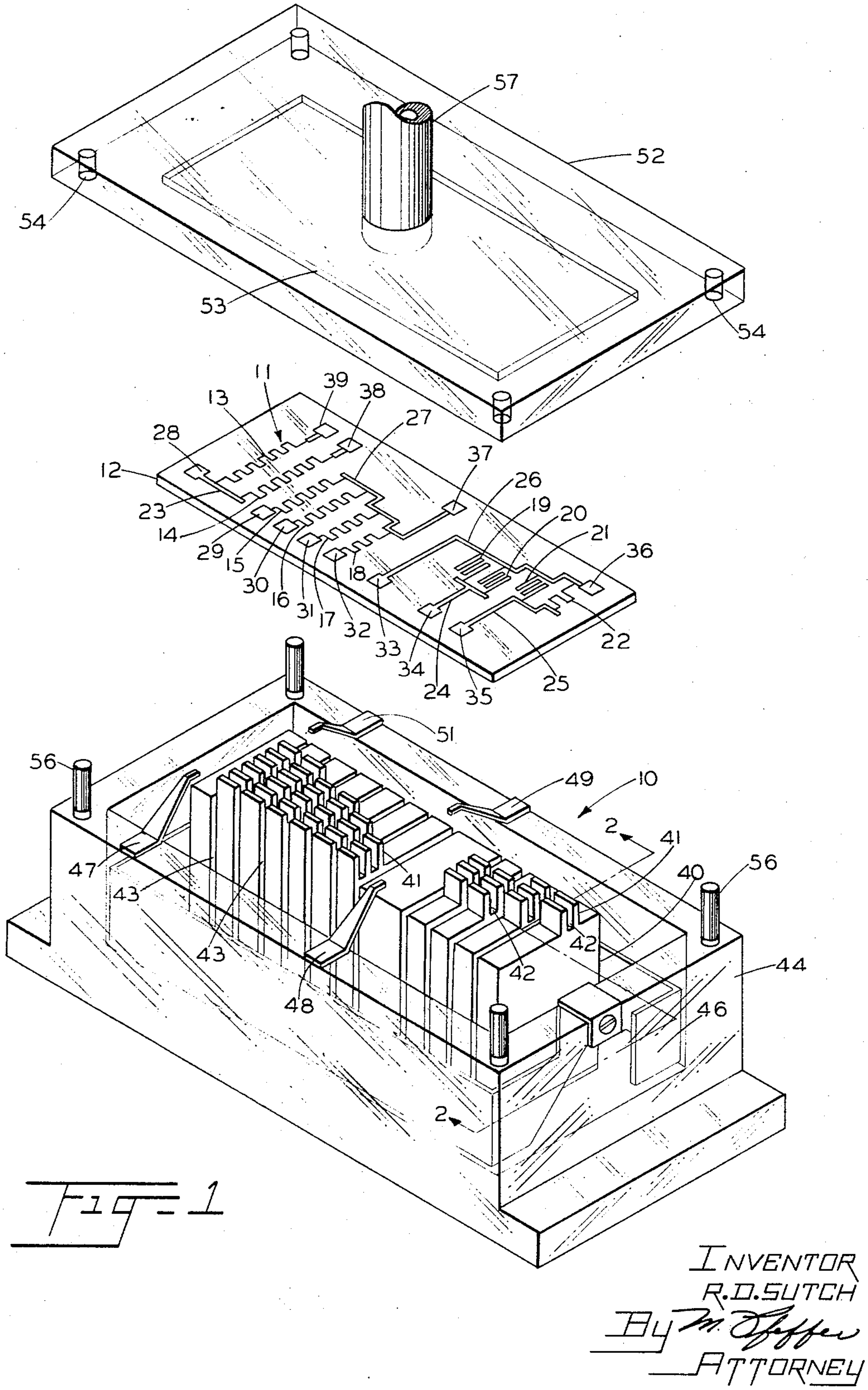
FIG. 1 is an exploded view, with portions removed for the sake of clarity, of apparatus forming one embodiment of the invention.
Figure 2:
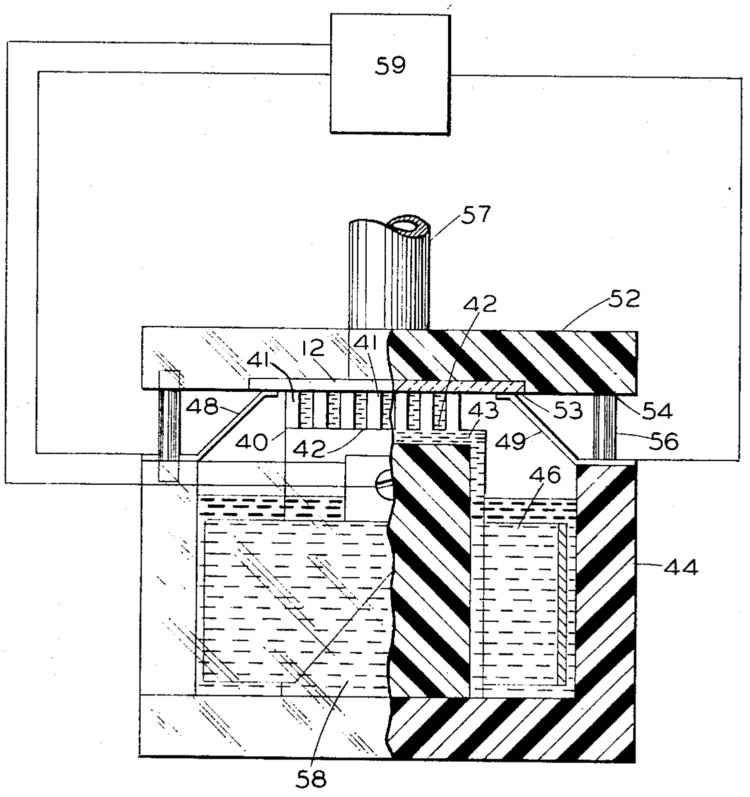
FIG. 2 is a view taken along the line 2—2 of FIG. 1.

Referring now to the drawings, and particularly to FIGS. 1 and 2, there is shown apparatus 10 for selectively anodizing portions of a metallic pattern, such as a thin film circuit 11 deposited on a suitable insulating substrate 12 which typically may be of glass or ceramic. In the present instance the thin film circuit 11 includes a plurality of thin film resistors 13 to 22, inclusive, of an anodizable metal, such as tantalum, and a plurality of low ohmic interconnecting paths 23 to 27, inclusive, and contacts 28 to 39, inclusive, which may comprise successive layers of a nickel-chromium alloy, copper and gold.

As previously mentioned, the thickness and geometric configuration of each resistor after film deposition and pattern generation is such that its value approximates, but is less than the desired value thereof. Further, all the resistors 13 to 22, inclusive, at this time are essentially the same percentage of their final values. Exact values of resistance are obtained by subjecting the resistors 13 to 22, inclusive, to a process of electrochemical anodization to oxidize the tantalum film. As the oxide thickness increases, the underlying tantalum layer decreases thereby increasing the resistance values of the resistors 13 to 22, inclusive. Accordingly, by suitable monitoring of resistance, the anodization can be terminated precisely when the resistors 13 to 22, inclusive, reach their desired values.

In carrying out the anodization, it is necessary to isolate the interconnecting paths 23 to 27, inclusive, and contacts 28 to 39, inclusive, from the anodizing solution to prevent short circuiting of the resistors 13 to 22, inclusive, and at the same time make electrical contact to certain of the contacts for purposes of supplying anodization potential to the resistors and to provide a means whereby the anodization process can be monitored.

These requirements are fulfilled by the apparatus 10 which includes a block 40 composed of a suitable dielectric material, such as a plastic sold under the trademark "Lucite." The block 40 is provided with a plurality of plate-like elements 41—41 extending from the top surface thereof terminating in a common working surface. The elements 41—41 are arranged in a grid-like pattern which is essentially a mirror image of the resistor portion of the thin film circuit and are spaced apart to define at least two capillaries between adjoining sides of each plate 41 and other adjacent plates. The spacing between each element 41 and the next adjacent parallel element 41 is such that a capillary 42, hereinafter referred to as a first capillary, is defined therebetween. Formed in the longitudinal sides of the block 40 and in the top surface thereof is a plurality of parallel channels or second capillaries 43—43, each of which is an extension of one of the capillaries formed by the elements 41—41 and thus is in communication with one or more of the first capillaries 42—42.

The block 40 is mounted within and extends slightly above a reservoir 44 also composed of a dielectric material such as "Lucite," and having a rectangular metallic electrode 46 disposed about its inner periphery in a manner such that the electrode is equidistant from each longitudinal side of the block 40. Secured to the rim of the reservoir 44 is a plurality of finger-like resilient electrodes 47, 48, 49 and 51 adapted to engage the contacts 28, 33, 37 and 39, respectively, of the thin film circuit 11 when the substrate 12 is placed atop the elements 41—41.

Suitable means, such as an alignment unit 52, is provided for placing the substrate 12 atop the elements 41—41 in a manner such that the contacts 28, 33, 37 and 39 engage the electrodes 47, 48, 49 and 51, respectively, and the resistors 13 to 22, inclusive, are in registration with the working surface defined by the elements 41—41 and the first capillaries 42—42, as shown in an exploded manner in FIG. 1. The alignment unit 52 is provided with a recess 53 for receiving the substrate 12 and with a plurality of apertures 54—54 through which a plurality of corresponding dowel pins 56—56, extending from the rim of the reservoir 44, enter to align the unit 52, and hence the substrate 12 with the first capillaries 42—42. The substrate 12 is secured to the alignment unit 52 by means of a partial vacuum drawn through an inlet line 57.

In operation, the reservoir 44 is filled with an anodizing or electrolytic solution 58 which typically may comprise .02 percent citric acid by weight in deionized water to partially submerge the block 40 and the second capillaries 43—43. By capillary action the solution flows from the supply in the reservoir up the second capillaries 43—43 to and up the first capillaries 42—42, filling these latter-mentioned capillaries and wetting the top edges of the elements 41—41. The substrate 12 is then placed atop the elements 41—41 in the manner described above whereby the resistors 13 to 22, inclusive, are wet by the anodizing solution 58. It should be noted that those portions of the resistors 13 to 22, inclusive, in registration with the elements 41—41 are wet by a thin film of electrolyte 58 which remains on the top edges of the elements after the substrate 12 is placed in position.

To accomplish the anodization, the electrodes 47, 48 and 49 are connected together and led to a suitable anodizing control circuit 59 which functions to supply a positive potential to the electrodes 47, 48 and 49 and hence, to the resistors 13 to 22, inclusive, the resistors thereby serving as anodes during anodization. It should be noted that the electrode 47 transmits the positive anodizing potential to the resistors 13 and 14 via contact 28 and interconnecting path 23; the electrode 48 transmits the positive anodizing potential to resistors 19, 20, 21 and 22 via contact 33 and interconnecting path 26; and the electrode 49 transmits the positive anodizing potential to resistors 15, 16, 17 and 18 via contact 37 and interconnecting path 27. The electrode 46, which serves as the cathode for the anodization process, is led to a point of negative or ground potential in the anodization control circuit 59. Suitable resistance monitoring means, such as a voltmeter calibrated in units of resistance, incorporated in the anodization control circuit 59 and connected to the electrodes 47 and 51 are provided for monitoring the resistance of the resistor 13. When the monitoring means indicates that the resistor 13 has reached its desired value, the anodizing process is terminated.

It should be noted that in the above-described operation of the apparatus all of the resistors were anodized simultaneously with monitoring of only one resistor, i.e., the resistor 13. This was made possible by virtue of the resistors 13 to 22, inclusive, initially being the same percentage of their final values. In cases where such is not true, either due to design or nonuniformity of film deposition, it may be desirable to anodize the resistors individually or in groups. Thus, for example, by connecting the electrodes 47, 48 and 49 to separate anodizing control circuits and connecting the cathode electrode 46 to each of these circuits the resistors 13 to 22, inclusive, can be anodized in three groups: one group including resistors 13 and 14, a second group including resistors 15, 16, 17 and 18, and a third group including resistors 19, 20, 21 and 22. Suitable monitoring connections would be provided to one resistor of each group. Accordingly, each group can be anodized independently of the other groups, termination of the anodization of any one of the groups being readily accomplished by removing anodization potential from its anode electrode.

To anodize the resistors individually requires that each resistor be electrically isolated from the other resistors. Where this condition does not exist in the thin film circuit, as in the instant case, it is still possible to anodize each resistor individually by providing each one with its own capillary block, reservoir and cathode. In accomplishing the anodization, the resistance of each resistor would be monitored and the anodization of any resistor terminated by opening up the cathode circuit associated therewith.

Figure 3:
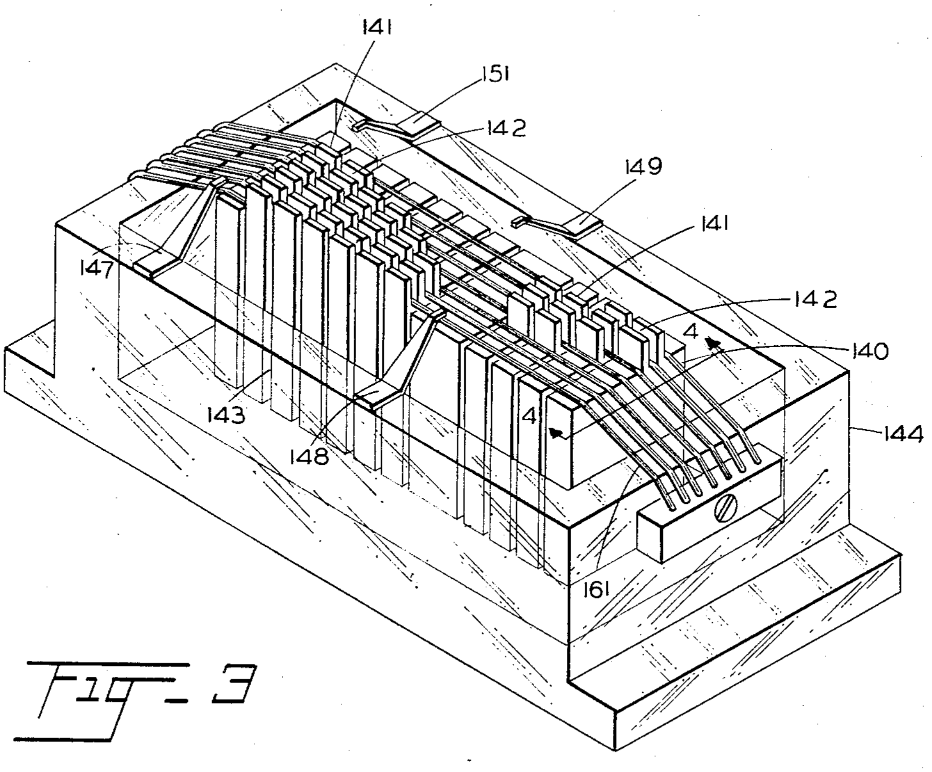
FIG. 3 is a perspective view, with portions removed for the sake of clarity, of another embodiment of the invention.
Figure 4:
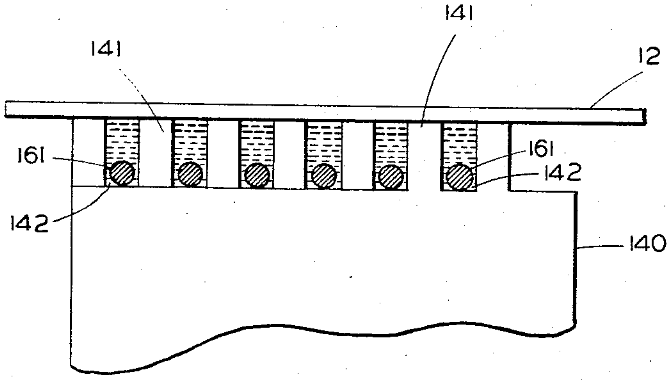
FIG. 4 is a view taken along the line 4—4 of FIG. 3 with the addition of a substrate and anodizing solution.

For the purpose of assuring complete uniformity of anodization, it is desirable that all resistors as well as all portions thereof "see" the cathode equally, that is, it is desirable that the ionic conduction path from each resistor portion to the cathode be the same for all of the resistors. One way this can be accomplished is illustrated in FIGS. 3 and 4. This embodiment includes a reservoir 144, a block 140 having first and second capillaries 142—142 and 143—143, respectively, and electrodes 147, 148, 149 and 151 all of which are identical in structure and function to those in the previous embodiment. It differs from the previous embodiment in that the cathode is formed by passing a bare conductive wire 161 through all of the first capillaries 142—142, the wire being connected to the cathode terminal of an anodizing control circuit (not shown). By virtue of this cathode arrangement all portions of each resistor will have essentially the same ionic conduction path to the cathode, i.e., the wire 161.

Figure 5:
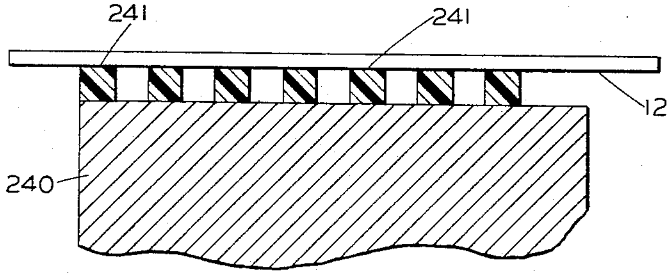
FIG. 5 is a vertical, sectional view, with portions removed for the sake of clarity, of apparatus forming still another embodiment of the invention.

Another way in which equal ionic conduction paths can be accomplished, as illustrated in FIG. 5, is with a block 240 having its main body portion composed of a suitable electrically conductive metal. Like the previous embodiments, the block 240 is provided with a plurality of plate-like elements 241—241 composed of a dielectric material such as Lucite. In use, the metallic portion of the block 240 would be connected to a cathode terminal of an anodizing control circuit. Thus, as with the wire cathode 161 of the embodiment of FIG. 3, all portions of each resistor will have essentially the same ionic conduction path to the cathode.

Advantageously, in order to further enhance uniformity of anodization, the capillary defining elements employed should be as thin as possible so as to provide straight line ionic conduction paths between the cathode and most of each resistor.

The term "capillary" as used in the specification and claims is meant to include any structural member(s) through which a fluid will rise by virtue of capillarity. In this connection it should be noted that the dimensions and configurations of the capillaries employed can be easily determined in accordance with the particular needs of a given situation by the use of well known hydrostatic formulae.

It is to be understood that the above-described embodiments are merely illustrative of the principles of the invention. Other embodiments may be devised by persons skilled in the art which embody these principles and fall within the spirit and scope thereof.

What is claimed is:

1. Apparatus for selectively anodizing a portion of a metallic pattern on an article, which comprises.
   (1) a support member having:
      (a) a first plurality of spaced, parallel plate-like elements extending from the top of said support member and being arranged in a configuration which is essentially a mirror image of the portion of the metallic pattern to be anodized, each plate-like element and the parallel plate-like element adjacent thereto defining a first capillary therebetween and each plate-like element terminating to define a common working surface and being composed of a dielectric material; and
      (b) a plurality of second capillaries formed in said support member in a manner such that each first capillary is in communication with at least one of said second capillaries;
   (2) reservoir means submerging said second capillaries for receiving anodizing solution and for supplying the same to said second capillaries, said solution flowing through said second capillaries to and up said first capillaries to wet said working surface;
   (3) means for placing the article on said plate-like elements in a manner such that said portion is in registration and wetting relationship with said first capillaries; and
   (4) means including a cathode for supplying anodizing potential across said portion and said anodizing solution.

2. Apparatus according to claim 1 in which said cathode is arranged with respect to said second capillaries such that it is equidistant from each one of said second capillaries.

3. Apparatus according to claim 1 in which said cathode includes a conductive member disposed within each of said first capillaries.

4. Apparatus according to claim 1 in which said support member is composed of an electrically conductive member and serves as the cathode.

5. Apparatus for selectively anodizing a thin film circuit supported on a substrate of dielectric material and including a plurality of electrical components and associated interconnecting paths and contacts, which apparatus comprises:
   an open-ended reservoir for receiving anodizing solution;
   a support member mounted within said reservoir;
   a plurality of spaced, parallel plate-like elements extending from the top of said support member and being arranged in a configuration which is essentially a mirror image of the electrical component portion of said thin film circuit, each plate-like element and the parallel plate-like element adjacent thereto defining a first capillary therebetween and each plate-like element being composed of a dielectric material;
   a plurality of second capillaries formed in said support member for receiving anodizing solution from said reservoir and supplying the same to said first capillaries;
   a conductive element disposed within each of said first capillaries;
   means for placing the substrate on said plate-like element in a manner such that the electrical component portion of the thin film circuit is in registration and wetting relationship with said first capillaries;
   means for supplying anodizing potential across said electrical components and each of said conductive elements; and
   means for monitoring the resistance of at least one of the components of said thin film circuit whereby the progress of the anodization process can be ascertained.

6. Apparatus according to claim 1 in which said plurality of second capillaries is defined by a second plurality of spaced, parallel plate-like elements, said second plurality of elements being non-parallel with respect to said first plurality of elements.

7. Apparatus according to claim 6 in which said second plurality is oriented orthogonal to said first plurality.

8. Apparatus according to claim 7, in which a plurality of rectangular-shaped units, formed from said orthogonally oriented elements, is arranged in a grid-like configuration which is essentially a mirror image of the portion of the metallic pattern to be anodized.

9. In an apparatus for anodizing an article:
   a grid-like array of parallel, electrically nonconductive plates spaced apart to define at least two capillaries between adjoining sides of each plate and other adjacent plates, said plates terminating in a common working surface,
   a reservoir partially submerging at least one of said capillaries for receiving anodizing liquid and supplying said liquid to both said capillaries,
   means for supporting the article in registration with said working surface to wet the article with liquid drawn from said reservoir by said capillaries, and
   means for applying anodizing current through said anodizing liquid to anodize the article.

10. In an apparatus for selectively anodizing a metallic thin-film pattern formed on the surface of a substrate, as set forth in claim 9, wherein:
   said means for applying anodizing current includes cathode means disposed between said parallel plates.

11. In an apparatus for selectively anodizing a metallic thin-film pattern on the surface of a substrate, as set forth in claim 9, wherein:
   said means for applying anodizing current includes an electrically conductive member which supports said plates.

12. In an apparatus for selectively anodizing a metallic thin-film pattern formed on the surface of a substrate:
   a reservoir containing an anodizing solution,
   a block having a plurality of parallel plate-like elements extending vertically from a top surface thereof, said plate-like elements being spaced apart and arranged to form first capillaries between adjoining sides of said elements and other adjacent elements,
   said block having a plurality of channels formed therein and extending down from said top surface to define second capillaries communicating with said first capillaries, said second capillaries being partially submerged in said reservoir to draw anodizing solution upward to supply said solution to said first capillaries,
   means for supporting the substrate at a distance from the top surface of said plate-like elements with selected portions of the metallic pattern on the substrate in registration with said plate-like elements to contact said capillary drawn anodizing solution to wet the selected portions of the metallic pattern, and
   means for applying an anodizing current to the metallic pattern on the substrate and the anodizing solution to anodize the selected portions of the metallic pattern.

13. In an apparatus for selectively anodizing a metallic thin-film pattern formed on the surface of a substrate, as set forth in claim 12, wherein:

said means for applying anodizing current includes a rectangular metallic electrode submerged in said anodizing solution and surrounding said block.

References Cited

UNITED STATES PATENTS

| | | | |
|---|---|---|---|
| 1,773,135 | 8/1930 | Flanzer | 204—15 |
| 2,080,234 | 5/1937 | Schlötter | 204—224 |
| 2,673,549 | 3/1954 | Frucki | 118—401 |
| 2,763,608 | 9/1956 | Pool | 204—224 |
| 3,150,068 | 9/1964 | Montgomery | 204—143 |
| 3,201,275 | 8/1965 | Herrick | 118—401 |
| 3,240,685 | 3/1966 | Maissel | 204—143 |

OTHER REFERENCES

Pirani et al., "Zeitschrift Fur Metallkunde," vol. 16, pp. 132, 133, April 1924.

ROBERT K. MIHALEK, *Primary Examiner.*

HOWARD S. WILLIAMS, *Examiner.*